(12) United States Patent
Gupta et al.

(10) Patent No.: US 7,201,227 B2
(45) Date of Patent: Apr. 10, 2007

(54) METHOD AND COMPOSITION FOR TREATING A SUBTERRANEAN FORMATION WITH SPLITTABLE FOAMS

(75) Inventors: D. V. Satyanarayana Gupta, The Woodlands, TX (US); Barry T. Hlidek, Cochrane (CA)

(73) Assignee: BJ Services Company, Houston, TX (US)

( * ) Notice: Subject to any disclaimer, the term of this patent is extended or adjusted under 35 U.S.C. 154(b) by 295 days.

(21) Appl. No.: 11/017,548

(22) Filed: Dec. 20, 2004

(65) Prior Publication Data

US 2006/0131021 A1    Jun. 22, 2006

(51) Int. Cl.
*E21B 43/26* (2006.01)
*E21B 43/267* (2006.01)

(52) U.S. Cl. ............... 166/300; 166/308.2; 166/308.3; 166/308.6; 166/309; 507/202; 507/212; 507/213; 507/214; 507/262; 507/268; 507/922

(58) Field of Classification Search ............. 166/308.6, 166/309; 507/202, 262
See application file for complete search history.

(56) References Cited

U.S. PATENT DOCUMENTS

| | | | |
|---|---|---|---|
| 3,909,460 A | 9/1975 | McCoy | 252/532 |
| 3,948,953 A | 4/1976 | McCoy | 260/340.9 |
| 4,440,653 A * | 4/1984 | Briscoe et al. | 507/202 |
| 4,519,455 A * | 5/1985 | Holtmyer et al. | 166/305.1 |
| 4,609,477 A * | 9/1986 | Crema | 507/202 |
| RE32,302 E | 12/1986 | Almond et al. | 166/308 |
| 5,069,283 A | 12/1991 | Mack | 166/308 |
| 5,566,760 A | 10/1996 | Harris | 166/308 |
| 5,744,064 A | 4/1998 | Galante et al. | 252/358 |
| 5,744,065 A | 4/1998 | Galante et al. | 252/358 |
| 6,460,632 B1 * | 10/2002 | Chatterji et al. | 175/66 |
| 6,966,379 B2 * | 11/2005 | Chatterji et al. | 166/308.6 |
| 6,986,392 B2 * | 1/2006 | Chatterji et al. | 166/300 |
| 7,104,327 B2 * | 9/2006 | Harris et al. | 166/308.5 |

OTHER PUBLICATIONS

Union Carbide Corporation, Triton SPSeries Surfactants, 1998, 16 pages.

* cited by examiner

*Primary Examiner*—George Suchfield
(74) *Attorney, Agent, or Firm*—Howrey LLP

(57) ABSTRACT

Disclosed herein is a method of treating a subterranean formation utilizing a fluid having a splittable foamer, i.e., a fluid that creates a stable foam when it contacts the formation but that loses its ability to foam as it remains in contact with the formation for extended time. The present method has the advantage that the fluid can be recovered from the well unhindered by the difficulties involved with recovering a foamed fluid from a well. The present method does not require the use of breakers, though the splitting of the foam can be accelerated by introducing an organic or inorganic acid into the well, if so desired.

30 Claims, 1 Drawing Sheet

METHOD AND COMPOSITION FOR TREATING A SUBTERRANEAN FORMATION WITH SPLITTABLE FOAMS

FIELD OF THE INVENTION

The invention relates to fracturing fluids and, more specifically, to fracturing fluids comprising carbon dioxide. In particular, fracturing fluids comprising carbon dioxide and a splittable foamer are disclosed.

BACKGROUND OF THE INVENTION

The treatment of subterranean formations penetrated by a well bore to stimulate the production of hydrocarbons therefrom or the ability of the formation to accept injected fluids has long been known in the art. One of the most common methods of increasing productivity of a hydrocarbon-bearing formation is to subject the formation to a fracturing treatment. This treatment is effected by injecting a liquid, gas or two-phase fluid, generally referred to as a fracturing fluid, down the well bore at sufficient pressure and flow rate to fracture the subterranean formation. A proppant material such as sand, fine gravel, sintered bauxite, glass beads or the like can be introduced into the fracture to prop the fracture open once the treatment has stopped. The propped fracture provides larger flow channels through which an increased quantity of a hydrocarbon can flow, thereby increasing the productive capability of a well.

Traditional fracturing techniques utilize water or oil-based fluids to fracture a hydrocarbon-bearing formation. Recently, fracturing techniques utilizing fluids comprising carbon dioxide and/or nitrogen have been developed. U.S. Pat. No. Re 32,302, by Almond et al., discusses a method of fracturing a subterranean formation with a stabilized foamed fracturing fluid comprising from about 50 percent to in excess of about 96 percent by volume of carbon dioxide with the remainder comprising an aqueous liquid and a selected surfactant. A foam is formed in situ by injection of a stabilized liquid-liquid emulsion containing liquid carbon dioxide into a well bore penetrating the formation. The temperature and pressure of the emulsion is controlled to maintain the carbon dioxide in the liquid phase during injection into the well bore. Thereafter, the carbon dioxide is heated by the subterranean formation to a temperature above about 88° F. at which time the stabilized emulsion spontaneously forms a stabilized foam.

U.S. Pat. No. 5,069,283, by Mack, describes a hydraulic fracturing process in which substantial quantities of both nitrogen and carbon dioxide are incorporated into the fracturing fluid. Nitrogen and carbon dioxide are separately incorporated into an aqueous based fracturing fluid in amounts to provide a volume ratio of nitrogen to carbon dioxide at wellhead conditions within the range of about 0.2–1.0. The volume ratio of the total of carbon dioxide and nitrogen to the aqueous phase of the aqueous fracturing fluid at wellhead conditions is within the range of about 1–4. The aqueous fracturing fluid containing the nitrogen and carbon dioxide is injected in the well under a pressure sufficient to implement hydraulic fracturing of the subterranean formation undergoing treatment. A thickening agent may be incorporated into water to provide a viscous aqueous based fracturing fluid to which the carbon dioxide and nitrogen are added. The carbon dioxide is incorporated in liquid phase and the nitrogen in gaseous phase. Propping agent is incorporated into at least a portion of the fracturing fluid. Addition of the propping agent takes place prior to addition of the carbon dioxide and nitrogen.

U.S. Pat. No. 5,566,760, by Harris, describes an aqueous foamed fracturing fluid composition and method for using the foamed fracturing fluid for fracturing subterranean formations wherein the foamed fracturing fluid comprises: (a) a viscosifier that is preferably either hydrophobically modified guar or hydrophobically modified hydroxymethylcellulose; (b) a surfactant that is preferably alpha olefin sulfonate; and (c) a gas phase that includes either nitrogen or carbon dioxide.

A deficiency in the present state of the art is that it is difficult to remove foamed fluids from the formation and from the well bore. One problem is that the foamed fluid tends to carry proppant material back out of the formation as the fluid is removed from the formation. The foamed fluid also causes problems in the flow-back tanks used to contain the recovered fluid. It is therefore common to use "breakers" to attempt to destroy the foam before recovering the fracturing fluid. Problems exist with using breakers, however. For example, breaker fluids themselves contain chemical emulsifiers, which have foaming tendencies. Therefore, a need exists in the art for methods of "breaking" foamed fracturing fluids so that they can be recovered from subterranean formations and well bores.

SUMMARY OF THE INVENTION

The present invention overcomes the above mentioned deficiencies in the art by providing a method of treating a subterranean formation utilizing a fluid having a splittable foamer, i.e., a fluid that creates a stable foam when it contacts the formation but that loses its ability to foam as it remains in contact with the formation for extended time. One of skill in the art will recognize that the present method has the advantage that the fluid can be recovered from the well in the unfoamed state, thereby reducing the difficulties involved with recovering a foamed fluid from a well. The present method does not require the use of breakers, though the splitting of the foam can be accelerated by introducing an organic or inorganic acid into the well, if so desired.

According to one embodiment of the invention, the method of treating a subterranean formation comprises providing a fluid comprising an aqueous liquid, carbon dioxide, and one or more splittable foamers selected from the group of compounds having formulas

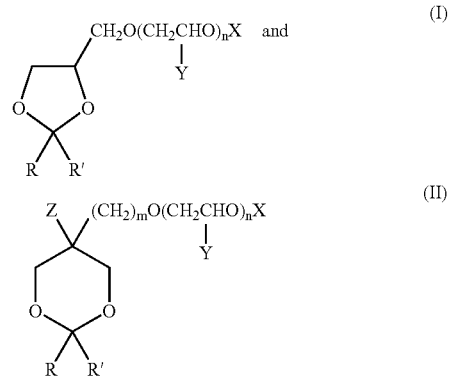

wherein, R and R' are independently selected from the group consisting of organic radicals having 4 to 20 carbon atoms, X is selected from the group consisting of H and organic radicals having 1 to 10 carbons, Y is selected from the group consisting of H and organic radicals having 1 to 5 carbons, Z is selected from the group consisting of H and organic radicals having 1 to 5 carbons, m is 0 or 1, and n is 1 to about 40. The method comprises introducing the fluid into a well bore and contacting the fluid and the subterranean formation for a sufficient time to permit the fluid to form a foam.

The present invention also provides a fracturing fluid for treating a subterranean formation. The fracturing fluid comprises an aqueous liquid, carbon dioxide, and one or more splittable foamers selected from compounds having formula I and formula II.

The present invention also provides a method of breaking a foamed fracturing fluid, wherein the foamed fracturing fluid comprises an aqueous liquid, carbon dioxide, and one or more splittable foamers selected from compounds having formula I and formula II. According to one embodiment of the invention, the method of breaking a foamed fracturing fluid does not require introducing chemical breakers into the well bore. Rather, the method comprises allowing carbonic acid to form in fracturing fluid and allowing the carbonic acid to break the foam. According to an alternative embodiment, one or more inorganic or organic acids can be introduced into the well bore to accelerate the breaking of a foamed fracturing fluid. These, and other aspects of the invention are discussed in more detail below.

DETAILED DESCRIPTION OF THE INVENTION

Figure 1:
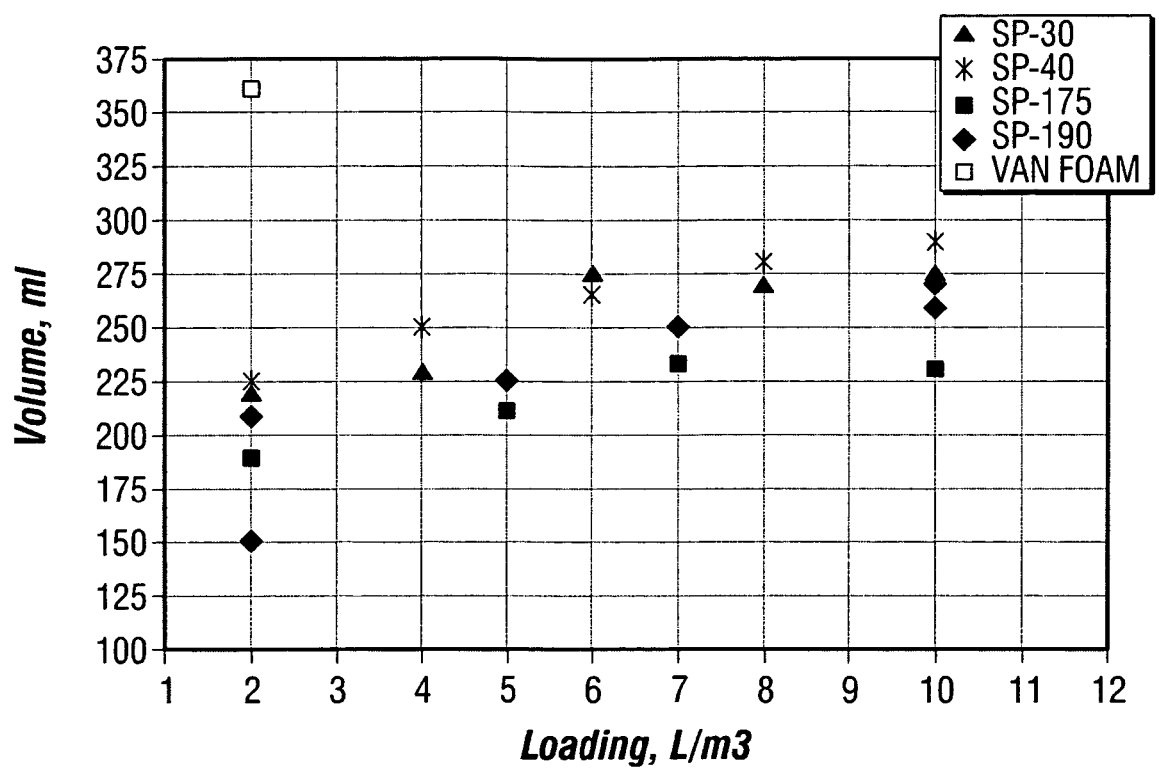
FIG. 1 shows the height of TRITON® SP-Series foams SP-30 (filled triangle), SP-40, (X), SP-175 (filled square), and SP-190 (filled diamond) in water (with no stabilizer/gel present) under an atmosphere of air. A standard sulfonate foaming agent (VAN FOAM, open square) is shown as a comparison.

As described above, traditional fracturing treatment involves injecting a water or oil-based fluid into a well with sufficient pressure and flow rate to fracture a hydrocarbon-bearing formation and using a proppant material to keep the fractures open. "Foam fracturing" involves introducing a foam into the formation to aid in delivering proppant into the formation. Typically such foams typically comprise a water or oil based fluid, a gas, and a suitable surfactant. Such compositions can be in the form of an emulsion as they are pumped into the well and become foams under the subterranean conditions of the formation.

U.S. Pat. No. Re 32,302, by Almond et al., reissued Dec. 9, 1986, the entire contents of which are incorporated herein by reference, describes a method of fracturing a subterranean formation with a stabilized foam comprising carbon dioxide, an aqueous liquid, and a surfactant. Typical surfactants, such as the ones described in U.S. Pat. No. Re 32,302, include cationic, anionic or nonionic compounds, such as betaines, sulfated alkoxylates, alkyl quaternary amines or ethoxylated linear alcohols. In such fluids, bubble-bubble interference creates viscosity, making the foam suitable for carrying proppant into the formation. However, it is difficult to recover the fracturing fluid when it is in the foamed state. Typically, the formation is treated with breakers, such as sodium persulfate or potassium persulfate to attempt to break up the foam so that the fracturing fluid can be recovered. Breakers are often ineffective, however, and problems persist in recovering such fracturing fluids.

The present invention overcomes this deficiency in the art by providing a method of treating a subterranean formation using a fracturing fluid comprising a splittable foamer. As used herein, "splittable foamer" refers to a surfactant that is capable of forming a foam under the conditions present in a subterranean formation and that loses its ability to foam as it remains in contact with the subterranean formation for an extended period of time. A particular embodiment of the invention utilizes a foamer that "splits", i.e., loses its ability to foam under acidic conditions. According to this embodiment, the splittable foamer is used as a surfactant in a fracturing fluid that also comprises carbon dioxide and an aqueous liquid. The fluid is an emulsion as it is pumped into the well, with the carbon dioxide being either gaseous, liquid, or supercritical. The fluid warms as it remains in contact with the formation, thereby creating a foam. With increasing time at the temperature of the formation, the fluid becomes acidic due to the formation of carbonic acid in equilibrium with the carbon dioxide and aqueous liquid in the fluid. The splittable foamer loses its ability to foam the longer it remains in contact with the formation because of the acidic conditions created there. Thus, the present invention provides an elegant method for treating a subterranean formation that does not require the use of breakers. External acid can be added to the formation, if desirable, to accelerate the splitting of the foam.

One aspect of the present invention is a method of treating a subterranean formation, by providing a fluid comprising an aqueous liquid, carbon dioxide, and one or more splittable foamers.

As used herein, aqueous liquid refers to water or to a mixture of water with a miscible organic co-solvent. Examples of suitable organic co-solvents include alcohols such as methanol, ethanol, and propanol. An example of a preferred aqueous liquid is a binary solution of about 20 to about 60 percent methanol and about 40 to about 80 percent water, more preferably about 30 to about 50 percent methanol and about 50 to about 70 percent water. An example of a preferred aqueous liquid is a binary solution comprising about 40 percent methanol and about 60 percent water. Aqueous liquids can also contain water soluble components such as salts, including potassium chloride and the like.

Carbon dioxide can be liquid carbon dioxide, gaseous carbon dioxide, or supercritical carbon dioxide. One of skill in the art will appreciate that the state of the carbon dioxide can be controlled by the temperature and pressure of the fluid. According to one embodiment, the carbon dioxide is a liquid and the ratio of carbon dioxide to aqueous liquid is about 1:1 to about 20:1, more preferably about 2:1 to about 18:1. An alternative expression of a preferred amount of carbon dioxide is an amount of carbon dioxide such that when the fluid is in the foamed state, the foamed fluid comprises about 50 percent to about 96 percent by volume of carbon dioxide, with the remaining comprising aqueous liquid and foamer.

According to one embodiment of the invention, the splittable foamer is selected from the group compounds having formulas

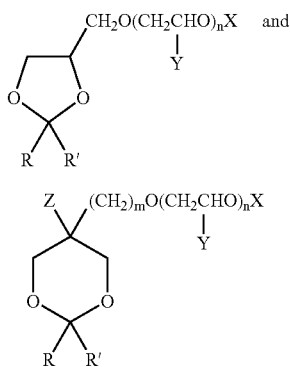

wherein, R and R' are independently selected from the group consisting of organic radicals having 4 to 20 carbon atoms, X is selected from the group consisting of H and organic radicals having 1 to 10 carbons, Y is selected from the group consisting of H and organic radicals having 1 to 5 carbons, Z is selected from the group consisting of H and organic radicals having 1 to 5 carbons, m is 0 or 1, and n is 1 to about 40. According to one embodiment, R is H and R' is the residue of an organic compound (substituted or unsubstituted) derived from an aldehyde of the formula RC(O)R' wherein R is hydrogen and R' is a residue of an organic compound (substituted or unsubstituted), which contains a total of 8 to 20 carbon atoms, preferably 10 to 18 carbon atoms, most preferably 12 to 15 carbon atoms; X is hydrogen or the residue of a hydrophobic end-cap, e.g., $CH_2C_6H_5$ or tert-butyl; Y is hydrogen, methyl, ethyl, or mixtures thereof; Z is hydrogen, methyl, or ethyl; m is 0 or 1; and, n is an integer of at least 1, preferably 1 to about 40, more preferably 2 to about 12, most preferably 3 to about 9. As used herein, the phrase "residue of an organic compound" is contemplated to include all permissible residues of organic compounds. (By the term "permissible" is meant all residues, moieties, etc., which do not significantly interfere with the performance of the surfactant for its intended purposes.) In a broad aspect, the permissible residues include acyclic and cyclic, branched and unbranched, carbocyclic and heterocyclic, aromatic and nonaromatic residues of organic compounds. Illustrative organic compound residues include, for example, alkyl, aryl, cycloalkyl, heterocycloalkyl, alkyl (oxyalkylene), aryl(oxyalkylene), cycloalkyl(oxyalkylene), heterocycloalkyl(oxyalkylene), hydroxy(alkyleneoxy), and the like. The permissible residues can be substituted or unsubstituted and the same or different for appropriate organic compounds. This invention is not intended to be limited in any manner by the permissible residues of organic compounds.

As used herein, the term "substituted" is contemplated to include all permissible substituents of organic compounds. In a broad aspect, the permissible substituents include acyclic and cyclic, branched and unbranched, carbocyclic and heterocyclic, aromatic and nonaromatic substituents of organic compounds. Illustrative substituents include, for example, alkyl, alkyloxy, aryl, aryloxy, hydroxy, hydroxyalkyl, halogen, and the like, in which the number of carbons can range from 1 to about 20 or more, preferably from 1 to about 12. The permissible substituents can be one or more and the same or different for appropriate organic compounds. This invention is not intended to be limited in any manner by the permissible substituents of organic compounds. It is understood by one skilled in the art that structures (I) and (II) above represent polyoxyalkylene derivatives of the acetal, and may be composed of mixtures of ethoxylates, propoxylates, or butoxylates produced in either a random or block mode process. While there is no specific known limit on the molecular weight of the aldehyde, as the number of carbon atoms in the aldehyde exceeds about 12–15, the resulting surfactant becomes more paraffin-like in nature. Although this could result in better phase separation, such aldehydes are not readily available (in commercial quantities) because of the difficulty of manufacturing and purifying them. U.S. Pat. No. 5,744,064, by Galante et al., issued Apr. 28, 1998, which is incorporated herein by reference in its entirety, and U.S. Pat. No. 5,744,065, by Galante et al., issued Apr. 28, 1998, which is incorporated herein by reference in its entirety describe surfactants suitable for use as splittable foamers in more detail.

It is desirable that the splittable foamers of the present invention comprise surfactants that have good foaming properties in the presence of carbon dioxide. Examples of preferred splittable foamers include the TRITON® SP-Series Surfactants (Union Carbide, Danbury, Conn.). TRITON® SP-30, SP-40, SP-175, and SP-190 are representative examples of preferred surfactants that can be used as splittable foamers, according to the present invention.

According to one embodiment of the invention, the fracturing fluid comprises about 1 to about 100 gallons, preferably about 5 to about 10 gallons of spittable foamer, per 1000 gallons of fracturing fluid. The fracturing fluid can also comprise a gelling agent or stabilizer mixed with the aqueous liquid to stabilize the foam and/or add viscosity to the foamed fluid. Examples of suitable gelling agents/stabilizers include hydratable polymers which contain, in sufficient concentration and reactive position, one or more of the functional groups, such as, hydroxyl, cis-hydroxyl, carboxyl, sulfate, sulfonate, amino or amide. Particularly suitable polymers are polysaccharides and derivatives thereof, which contain one or more of the following monosaccharide units: galactose, mannose, glucoside, glucose, xylose, arabinose, fructose, glucuronic acid or pyranosyl sulfate. Natural hydratable polymers containing the foregoing functional groups and units include guar gum and derivatives thereof, locust bean gum, tara, konjak, tamarind, starch, cellulose and derivatives thereof, karaya, xanthan, tragacanth and carrageenan. The use of gelling agents/stabilizers in foamed fracturing fluids is known in the art and is discussed more thoroughly in Re 32,302, and in U.S. Pat. No. 5,566,760, by Harris, issued Oct. 22, 1996, the entire contents of which are incorporated herein by reference. Any of the gelling agents/stabilizers know in the art can be used with the present invention.

The present invention provides a method of transporting and placing proppant material into a fractured subterranean formation. Proppant materials are widely recognized in the art and any proppant material can be used with the present invention. Examples of common recognized proppant materials include sand, graded gravel, glass beads, sintered bauxite, resin-coated sand, and the like.

In the practice of the present invention, a fracturing fluid is prepared by admixing, under suitable conditions of temperature and pressure, a quantity of carbon dioxide with an aqueous liquid and a spittable foamer to form a stabilized liquid-liquid emulsion. Re 32,302, incorporated herein by reference, describes in detail how such an operation is carried out using liquefied carbon dioxide and conventional surfactants. Briefly, liquefied carbon dioxide is provided from a surface vessel at a temperature and pressure sufficient to maintain the liquid conditions of the normally gaseous carbon dioxide, such as for example, a temperature of about 0° F. and a pressure of about 300 psia. The liquid carbon dioxide is admixed with the aqueous fluid in an amount sufficient to provide a volumetric ratio of liquid carbon dioxide to aqueous fluid in the range of from about 1:1 to about 20:1. Preferably, the ratio is in the range of from about 2:1 to about 18:1. The foam formed from the emulsion will have a quality of from about 50 percent to in excess of about 96 percent. The term "quality" as used herein is intended to mean the percentage of the volume of carbon dioxide at the existing temperature and pressure within the formation to the volume of the carbon dioxide plus the volume of the aqueous fluid and any other liquid components present in the fracturing fluid.

The stabilized emulsion that is formed preferably has a fine cell size distribution or texture. The term "cell size" as used herein means the size of the gaseous or liquid carbon dioxide droplet (i.e., the internal phase) that is surrounded by the aqueous fluid in the emulsion (i.e., the external phase). The term "texture" as used herein means the general appearance of the distributed cells of gaseous or liquid carbon dioxide in the emulsion. The fine texture of the emulsion of the present invention permits the transport of high concentrations of proppant material. The fine texture of the emulsion also results in the formation of a foam having a smaller cell size than otherwise would be possible such as by conventional foam generation methods in which the foam is generated on the surface and pumped into the subterranean formation.

Typically the proppant material is admixed with the gelled aqueous liquid prior to admixing with the liquid carbon dioxide. The admixing of the proppant material with the gelled liquid can be effected in any suitable mixing apparatus, such as for example, a batch mixer or the like. The amount of proppant material admixed with the gelled aqueous liquid may be varied to provide the desired amount of proppant in the two-phase fluid introduced into the formation. The proppant material can be admixed with the aqueous liquid in an amount of from about zero pounds of proppant per gallon of aqueous liquid up to as many pounds of proppant material per gallon as may be pumped. Depending upon formation reservoir conditions, the amount of proppant material transported by the two-phase fluid within the subterranean formation generally can be in the range of from about ½ pound to about 15 pounds per gallon of two-phase fracturing fluid without a screen out occurring.

According to one embodiment, the fracturing fluid of the present invention is introduced into the well bore which penetrates the subterranean formation to be treated at a temperature below the critical temperature of the carbon dioxide and at a pressure above the critical pressure of the carbon dioxide. The initial viscosity of the liquid-liquid emulsion comprising the fracturing fluid is such that the fluid is easily pumped through the well bore, however, the viscosity of the fluid still is sufficient to support a significant quantity of proppant material.

As the fracturing fluid is introduced into the subterranean formation, the fluid is heated to a temperature above the critical temperature of the carbon dioxide. As the liquid-liquid emulsion is heated to a temperature above the critical temperature of the carbon dioxide, the fluid maintains its viscosity and undergoes conversion into a foam. The foam as well as the emulsion is stabilized by the presence of the splittable foamer and the gelling agent present in the fracturing fluid. As the liquid carbon dioxide undergoes conversion to a gas, a slight increase in the volume of the carbon dioxide occurs. The term "gas" as used herein means a fluid at a temperature equal to or above the critical temperature of the fluid while maintained at any given pressure. Upon conversion of the stabilized liquid-liquid emulsion of the present invention to a foam, the foam is substantially stabilized and it continues to transport the proppant material into the fracture formed in the subterranean formation by the foamed fracturing fluid with at least substantially the same effectiveness as a gelled liquid.

After the introduction of the full amount of the calculated or estimated volume of fracturing fluid necessary to fracture the formation and transport the proppant material, the well bore can be shut-in for a period of time sufficient to permit stabilization of the subterranean formation. In one embodiment, the well is shut-in for a period of time to permit the formation to at least partially close upon the proppant material and stabilize the fracture volume. The shut-in period can be from several minutes to in excess of about 12 hours. As the foamed fluid continues to remain in contact with the formation, the pH of the fluid becomes more acidic due to the shift in equilibrium of the dissolved carbon dioxide in water towards the formation of carbonic acid. The carbonic acid "splits" the foam, decreasing its ability to maintain the foam state. The fluid therefore becomes less foam-like and more like two discrete phases of liquid and gas. This greatly facilitates the recovery of the fluid from the formation.

After the subterranean formation has stabilized, the well is opened under controlled conditions and the pressure drop in the well bore causes the foam to break. The remaining carbon dioxide gas then moves from the formation into the well bore and exits the well bore at the surface. The gas carries from the formation substantially all of the liquids present in the fracturing area, which leaves the formation and well clean and ready for the commencement of production.

According to some embodiments of the invention, it may be desirable to have a shorter shut-in period, or no shut-in period. In such cases, introducing an inorganic or organic acid into the well bore can accelerate the splitting of the foam. Examples of suitable acids include hydrochloric, sulfuric, hydrofluoric, acetic, citric, formic, oxalic, phosphoric, sulfonic, adipic, fumaric and propionic acid.

The foregoing has described embodiments of the invention utilizing a foamed fluid having carbon dioxide as the internal phase. An alternative embodiment of the invention utilizes a mixed internal phase comprising carbon dioxide and nitrogen, such as the mixed internal phase described in U.S. Pat. No. 5,069,283, by Mack, issued Dec. 3, 1991, the entire contents of which are hereby incorporated herein by reference. One embodiment of the present invention utilizes a process such as the one described by Mack but utilizing the splittable foamers disclosed in the instant specification. Briefly, substantial quantities of both nitrogen and carbon dioxide are incorporated into the fracturing fluid. Nitrogen and carbon dioxide are separately incorporated into an aqueous based fracturing fluid in amounts to provide a volume ratio of nitrogen to carbon dioxide at wellhead conditions within the range of about 0.2 to about 1.0. The volume ratio of the total of carbon dioxide and nitrogen to the aqueous phase of the aqueous fracturing fluid at wellhead conditions is typically about 1 to about 4. The aqueous fracturing fluid containing the nitrogen and carbon dioxide is injected in the well under a pressure sufficient to implement hydraulic fracturing of the subterranean formation undergoing treatment. As described above, a gelling agent or stabilizer may be incorporated into the aqueous phase to provide a viscous aqueous based fracturing fluid to which the carbon dioxide and nitrogen are added. The carbon dioxide is incorporated in liquid phase and the nitrogen in gaseous phase. Propping agent is incorporated into at least a portion of the fracturing fluid. Addition of the propping agent takes place prior to addition of the carbon dioxide and nitrogen. All of the aspects described above for the embodiment the invention employing a carbon dioxide internal phase are equally applicable to the embodiment of the invention employing a carbon dioxide/nitrogen internal phase.

One of skill in the art will appreciated that disclosed, described, and enabled within the present disclosure is a method of treating a subterranean formation utilizing a fluid having a splittable foamer, i.e., a fluid that creates a stable foam when it contacts the formation but that loses its ability to foam as it remains in contact with the formation for extended time. One of skill in the art will recognize that the present method has the advantage that the fluid can be recovered from the well in the unfoamed state, thereby minimizing the difficulties typically involved with recovering a foamed fluid from a well. The present method does not require the use of breakers, though the splitting of the foam can be accelerated by introducing an organic or inorganic acid into the well, if so desired. One of skill in the art will appreciate that the present invention is particularly advantageous for use in environmentally sensitive applications, such as in areas such as the North Sea, which require degradation with time to meet biodegradability requirements.

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the invention.

EXAMPLES

Example 1

Splittable Foam Behavior in Air and in Carbon Dioxide

Figure 2:
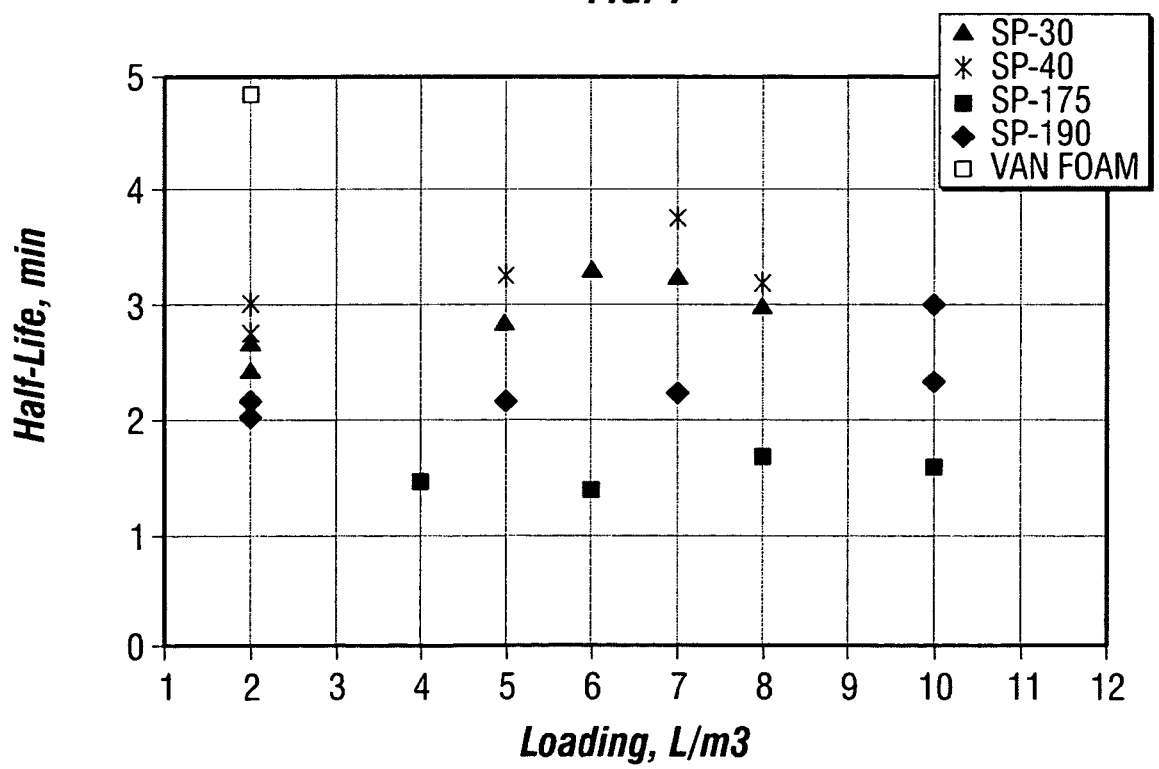
FIG. 2 shows the half-life of TRITON® SP-Series foams SP-30 (filled triangle), SP-40, (X), SP-175 (filled square), and SP-190 (filled diamond) in water (with no stabilizer/gel present) under an atmosphere of air. A standard sulfonate foaming agent (VAN FOAM, open square) is shown as a comparison.

Foaming agent stability for splittable foams was tested using a Waring blender, with and without the presence of carbon dioxide. Foams were generated, either with air or under a carbon dioxide blanket, by mixing 100 mL samples at the highest speed for 60 seconds. Foam height and half-life were measured using graduated cylinders and a timer. FIG. 1 shows foam height of TRITON® SP-Series foams SP-30 (filled triangle), SP-40, (X), SP-175 (filled square), and SP-190 (filled diamond) in water (with no stabilizer/gel present) under an atmosphere of air. A standard sulfonate foaming agent (VAN FOAM, open square) is shown as a comparison. FIG. 2 shows the half-life of these foams. The foaming ability of the splittable foamers in the presence of carbon dioxide is similar to that with air. The SP surfactants were not very effective for foaming in diesel or 100% methanol, but SP-190 was effective in 40% methanol. Results of multiple trials under various conditions are tabulated in Table 1.

Hydrochloric acid at a pH of about 2.0 and acetic acid at pH about 3.0 appeared to degrade the foams. A number of trials were conducted to determine the effect of $CO_2$ on the breakdown of the surfactant. The foamers partially broke down in the presence of carbon dioxide, but still exhibited limited foaming behavior after six days under 50 psi of carbon dioxide. SP-190 exhibited foaming tendency after being subjected to carbon dioxide (850 psi) overnight. The foams lose foaming tendency in the presence of carbonic, acetic, and hydrochloric acids.

TABLE 1

Foaming properties under various conditions of TRITON ® SP-Series foams measured in graduated cylinder.

| Foamer | Load[a] | External Phase | Vol. (mL) | Height (mL) | ½ Life (hr:min) | Conditions/Notes |
|---|---|---|---|---|---|---|
| SP-190 | 2 | $H_2O$ | 200 | 300 | 1:00 | pH 2.5 w/HCl, tested after 20 hrs. |
| SP-190 | 2 | $H_2O$, complexor | 200 | 300 | 1:34 | 6 L AQM-20 Complexer[b], pH 3.2, 3 days, good quality, sharp interface |
| SP-40 | 2 | $H_2O$, HCl | 100 | 110 | 0:05 | pH 2, cloudy |
| SP-40 | 2 | $H_2O$, Acetic Acid | 100 | 150 | 1:00 | pH 3 |
| SP-175 | 2 | $H_2O$ | 100 | 189 | 1:20 | pH 7.0 |
| SP-175 | 5 | $H_2O$ | 100 | 212 | 1:27 | pH 7.0 |
| SP-175 | 7 | $H_2O$ | 100 | 234 | 1:23 | pH 7.0 |
| SP-175 | 10 | $H_2O$ | 100 | 230 | 1:40 | pH 7.0 |
| SP-175 | 15 | $H_2O$ | 100 | 248 | 1:35 | pH 7.0 |
| SP-190 | 2 | $H_2O$ | 100 | 208 | 2:00 | pH 7.0 |
| SP-190 | 5 | $H_2O$ | 100 | 226 | 2:08 | pH 7.0 |
| SP-190 | 7 | $H_2O$ | 100 | 250 | 2:07 | pH 7.0 |
| SP-190 | 10 | $H_2O$ | 100 | 270 | 2:20 | pH 7.0 |
| SP-190 | 10 | $H_2O$ | 100 | 260 | 3:00 | pH 7.0 |
| SP-190 | 15 | $H_2O$ | 100 | 270 | 2:30 | pH 7.0 |
| SP-30 | 10 | $H_2O$ | 100 | 275 | 3:00 | pH 7.0, SP-30 diluted in $H_2O$ at 50 wt % |
| SP-40 | 10 | $H_2O$ | 100 | 290 | 3:10 | pH 7.0, SP-40 diluted in $H_2O$ at 25 wt % |

TABLE 1-continued

Foaming properties under various conditions of TRITON ® SP-Series foams measured in graduated cylinder.

| Foamer | Load[a] | External Phase | Vol. (mL) | Height (mL) | 1/Life (hr:min) | Conditions/Notes |
|---|---|---|---|---|---|---|
| SP-30 | 2 | $H_2O$ | 100 | 220 | 3:25 | pH 7.0, SP-30 diluted in $H_2O$ at 25 wt %, fuzzy interface |
| SP-30 | 4 | $H_2O$ | 100 | 230 | 2:40 | pH 7.0, SP-30 diluted in $H_2O$ at 25 wt %, fuzzy interface |
| SP-30 | 6 | $H_2O$ | 100 | 275 | 2:50 | pH 7.0, SP-30 diluted in $H_2O$ at 25 wt %, fuzzy interface |
| SP-30 | 8 | $H_2O$ | 100 | 270 | 3:15 | pH 7.0, SP-30 diluted in $H_2O$ at 25 wt %, fuzzy interface |
| SP-40 | 2 | $H_2O$ | 100 | 225 | 2:45 | pH 7.0, SP-40 diluted in $H_2O$ at 25 wt %, fuzzy interface |
| SP-40 | 4 | $H_2O$ | 100 | 250 | 3 | pH 7.0, SP-40 diluted in $H_2O$ at 25 wt %, fuzzy interface |
| SP-40 | 6 | $H_2O$ | 100 | 265 | 3:15 | pH 7.0, SP-40 diluted in $H_2O$ at 25 wt %, fuzzy interface |
| SP-40 | 8 | $H_2O$ | 100 | 280 | 3:45 | pH 7.0, SP-40 diluted in $H_2O$ at 25 wt %, fuzzy interface |
| SP-190 | 10 | $H_2O$ | 100 | 260 | 3:00 | pH 7.0 |
| SP-190 | 10 | $H_2O$ | 100 | 180 | <1:00 | $CO_2$ Bubbled in, pH 4.2 |
| SP-190 | 10 | $H_2O$ | 100 | 260 | 1:36 | $CO_2$ Bubbled in (20 min.); Large bubbles, not too stable, pH 4.1 |
| SP-190 | 10 | $H_2O$ | 100 | 230 | 0:28 | $CO_2$ Bubbled in (20 min.), pH 4.2 |
| SP-190 | 10 | $H_2O$, WG-15[c] | 100 | 285 | 9:34 | $CO_2$ Bubbled in (20 min.), pH 4.38 |
| SP-190 | 10 | $H_2O$, WG-15[c] | 125 | 215 | >2:00 | Overnight with $CO_2$ at 160 psi, surfactant still works |
| SP-190 | 2 | $H_2O$ | 190 | 235 | 0:30 | 4 hr. in cell with dry ice |
| SP-190 | 3 | $H_2O$ | 200 | 450 | 2:20 | $CO_2$ at 100 psi, 50° C., 4.5 hrs. |
| SP-190 | 3 | $H_2O$ | 200 | 410 | 1:44 | 6 L AQM-20 Complexer[b], $CO_2$ at 100 psi, 50° C., 4. hrs. |
| SP-190 | 10 | $H_2O$, WG-15[c] | 200 | 570 | 16:10 | $CO_2$ Bubbled in (20 min.), pH 4.46 |
| SP-190 | 10 | $H_2O$ | 200 | 540 | 3:22 | Foamed out of cell after overnight at 850 psi $CO_2$ at room temp. |
| SP-190 | 10 | $H_2O$ | | | | Foamed out of cell after overnight at 850 psi $CO_2$ at 30° C. |
| SP-40 | 2 | $H_2O$ | 100 | 180 | 2:00 | 50 psi, $CO_2$, 1 day |
| SP-40 | 2 | $H_2O$ | 100 | 160 | 1:15 | 50 psi, $CO_2$, 4 days |
| SP-40 | 2 | $H_2O$ | 100 | 170 | 2:00 | 50 psi, $CO_2$, 6 days |
| SP-40 | 2 | $H_2O$ | 100 | 160 | 1:30 | $CO_2$ Bubbled in for 10 min in blender, pH 4.3 |
| Betaine | 2 | $H_2O$ | 100 | 240 | <1:00 | $CO_2$ Bubbled in for 10 min in blender, pH 4.3 |
| Van Foam | 2 | $H_2O$ | 100 | 265 | 1:30 | $CO_2$ Bubbled in for 10 min in blender, pH 4.3 |
| SP-40 | 2 | $H_2O$ | 100 | 180 | 2:00 | $CO_2$ overnight, no pressure 8 days, clear |
| SP-190 | 10 | $H_2O$ | 100 | 180 | <1:00 | $CO_2$ Bubbled in, pH 4.2 |
| SP-190 | 10 | $H_2O$ | 100 | 260 | 1:30 | $CO_2$ Bubbled in, slow stirring for 20 min., pH 4.1 |
| SP-190 | 10 | $H_2O$ | 100 | 230 | 0:30 | $CO_2$ Bubbled in, slow stirring for 20 min., pH 4.1 |
| SP-190 | 10 | $H_2O$, WG-15[c] | 100 | 285 | 9:30 | $CO_2$ Bubbled in, stirring for 20 min., pH 4.4, Foamed after 120 psi overnight |
| SP-190 | 10 | $H_2O$, WG-15[c] | 100 | 215 | <2:00 | $CO_2$ Bubbled in, stirring for 20 min., pH 4.5, after 160 psi overnight |
| OF-1[d] | 15 | Diesel | 100 | 172 | 0:55 | |
| SP-135 | 15 | Diesel | 100 | 130 | None | |
| SP-140 | 15 | Diesel | 100 | 135 | None | |
| None | 0 | WG-15[c] | 100 | 140 | 0:55 | Gel only |

TABLE 1-continued

Foaming properties under various conditions of TRITON ® SP-Series foams measured in graduated cylinder.

| Foamer | Load[a] | External Phase | Vol. (mL) | Height (mL) | 1/Life (hr:min) | Conditions/Notes |
|---|---|---|---|---|---|---|
| SP-140 | 10 | WG-15[c] | 100 | 164 | ND | |
| SP-160 | 10 | WG-15[c] | 100 | 270 | >20:00 | |
| SP-175 | 10 | WG-15[c] | 100 | 300+ | >20:00 | |
| SP-190 | 10 | WG-15[c] | 100 | 300 | >0:20 | |
| SP-190 | 3 | 6 L, AQM-16 slurry[e] | | 300 | >5:00 | Good Quality |
| SP-190 | 3 | WG-15[c] | | 500 | >15:00 | |
| SP-190 | 5 | AQM-12[f] slurry | | 350 | >15:00 | |
| SP-190 | 10 | AQM-12 slurry | | 400 | >20:00 | |
| SP-190 | 10 | WG-15[c] | 100 | 570 | >10:00 | $CO_2$ Bubbled in, stirring for 20 min., pH 4.5, |
| SP-175 | 2 | $H_2O$/MeOH[g] | 100 | 158 | 0:55 | |
| SP-175 | 5 | $H_2O$/MeOH[g] | 100 | 250 | 1:05 | |
| SP-175 | 7 | $H_2O$/MeOH[g] | 100 | 258 | 1:15 | |
| SP-175 | 10 | MeOH | 100 | 100 | 0 | |
| SP-175 | 10 | $H_2O$/MeOH[g] | 100 | 280 | 1:27 | |
| SP-175 | 15 | $H_2O$/MeOH[g] | 100 | >250 | 1:29 | |
| SP-190 | 2 | $H_2O$/MeOH[g] | 100 | 156 | 1:05 | |
| SP-190 | 5 | $H_2O$/MeOH[g] | 100 | 258 | 0:55 | |
| SP-190 | 7 | $H_2O$/MeOH[g] | 100 | 270 | 1:02 | |
| SP-190 | 10 | $H_2O$/MeOH[g] | 100 | >280 | 1:26 | |
| SP-190 | 15 | $H_2O$/MeOH[g] | 100 | >250 | 2:00 | |
| SP-190 | 3 | Enron Slough water | 200 | 440 | 1:30 | |
| Betaine | 2 | $H_2O$ | 100 | 300 | 2:50 | |
| Van Foam | 2 | $H_2O$ | 100 | 360 | 4:50 | |

[a]$L/m^3$ (gal/1000 g)
[b]AQM-20 complexor is an acetic acid buffer
[c]WG-15 is a Guar, loading at 3 $Kg/m^3$ (25 lb/1000 gal)
[d]OF-1 is a flourosurfactant based hydrocarbon foamer.
[e]AQM-16 slurry is a slurry of Carboxymethylguar in mineral oil, loading at 6 $L/m^3$ (25 lb/1000 gal of polymer)
[f]AQM-12 slurry is a guar slurry in mineral oil, loading at 6 $L/m^3$ (25 lb/1000 gal of polymer).
[g]60/40 $H_2O$/MeOH

What is claimed is:

1. A method of treating a subterranean formation, comprising: providing a fluid comprising an aqueous liquid, carbon dioxide, and one or more splittable foamers selected from the group of compounds having formulas

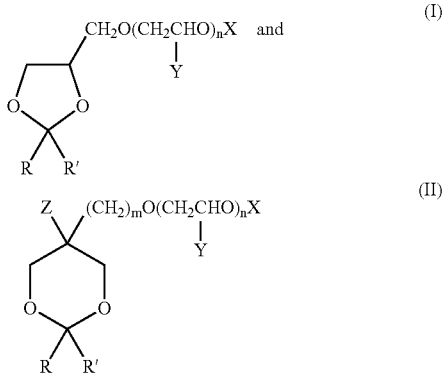

wherein, R and R' are independently selected from the group consisting of organic radicals having 4 to 20 carbon atoms, X is selected from the group consisting of H and organic radicals having 1 to 10 carbons, Y is selected from the group consisting of H and organic radicals having 1 to 5 carbons, Z is selected from the group consisting of H and organic radicals having 1 to 5 carbons, m is 0 or 1, and n is 1 to about 40;
introducing the fluid into a well bore; and
contacting the fluid and the subterranean formation for a sufficient time to permit the fluid to form a foam.

2. The method of claim 1, wherein the aqueous liquid comprises water.

3. The method of claim 1, wherein the aqueous liquid comprises about 50% to about 70% by volume of water and about 30% to about 50% by volume of an alcohol.

4. The method of claim 1, wherein the carbon dioxide is liquid carbon dioxide and wherein the ratio of carbon dioxide to aqueous liquid is about 1:1 to about 20:1.

5. The method of claim 1, wherein the carbon dioxide is liquid carbon dioxide and wherein the ratio of carbon dioxide to aqueous liquid is about 2:1 to about 18:1.

6. The method of claim 1, wherein the carbon dioxide is liquid carbon dioxide and the fluid is introduced into the well bore at a temperature and pressure such that the temperature of the fluid is below the critical temperature of carbon dioxide.

7. The method of claim 1, wherein R and R' are selected from the group consisting of alkyl, aryl, cycloalkyl, heterocycloalkyl, alkyl(oxyalkylene), aryl(oxyalkylene), cycloalkyl(oxyalkylene), heterocycloalkyl(oxyalkylene), and hydroxy(alkyleneoxy) radicals.

8. The method of claim 1, wherein X is selected from the group consisting of H and $CH_2C_6H_5$.

9. The method of claim 1, wherein Y is selected from the group consisting of H, methyl, ethyl, and mixtures thereof.

10. The method of claim 1, wherein Z is selected from the group consisting of H, methyl, and ethyl.

11. The method of claim 1, wherein the composition comprises about 1 to about 100 gallons of foamer per 1000 gallons of composition.

12. The method of claim 1, wherein the fluid comprises about 5 to about 10 gallons of foamer per 1000 gallons of composition.

13. The method of claim 1, wherein the fluid further comprises nitrogen.

14. The method of claim 13, wherein the ratio of nitrogen to carbon dioxide is about 1 to about 4.

15. The method of claim 1, wherein the fluid further comprises a stabilizer.

16. The method of claim 15, wherein the stabilizer is selected from the group consisting of:
- hydratable polymers containing one or more of the functional groups selected from the group consisting of hydroxyl, cis-hydroxyl, carboxyl, sulfate, sulfonate, amino and amide;
- polysaccharides and derivatives thereof containing one or more monosaccharide units selected from the group consisting of galactose, mannose, glucoside, glucose, xylose, arabinose, fructose, glucuronic acid or pyranosyl sulfate;
- natural hydratable polymers containing a functional group selected from the group consisting of hydroxyl, cis-hydroxyl, carboxyl, sulfate, sulfonate, amino and amide;
- guar gum and derivatives thereof, locust bean gum, tara, konjak, tamarind, starch, cellulose and derivatives thereof, karaya, xanthan, tragacanth and carrageenan.

17. The method of claim 1, wherein the fluid further comprises a proppant.

18. The method of claim 17, wherein the proppant is selected from the group consisting of sand, graded gravel, glass beads, sintered bauxite, and resin-coated sand.

19. The method of claim 1, further comprising allowing carbonic acid to form in the composition while the fluid is in contact with the subterranean formation.

20. The method of claim 19, further comprising allowing the carbonic acid to break the foam and removing the fluid from the formation.

21. The method of claim 1, wherein the method does not further comprise introducing a breaker into the well bore.

22. The method of claim 1, further comprising introducing a breaker into the well bore.

23. The method of claim 22, wherein the breaker is an acid.

24. The method of claim 23, wherein the acid is selected from the group consisting of hydrochloric, sulfuric, hydrofluoric, acetic, citric, formic, oxalic, phosphoric, sulfonic, adipic, fumaric and propionic acid.

25. A method of breaking a foamed fracturing fluid, wherein the foamed fracturing fluid comprises an aqueous liquid, carbon dioxide, and one or more splittable foamers selected from the group of compounds having formulas

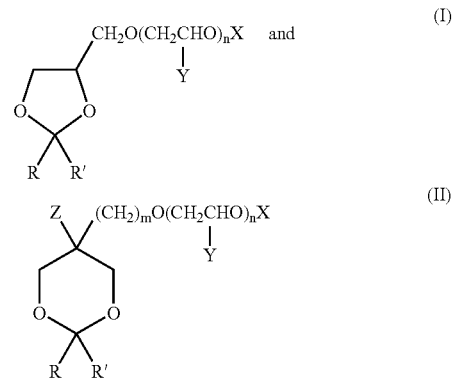

wherein, R and R' are independently selected from the group consisting of organic radicals having 4 to 20 carbon atoms, X is selected from the group consisting of H and organic radicals having 1 to 10 carbons, Y is selected from the group consisting of H and organic radicals having 1 to 5 carbons, Z is selected from the group consisting of H and organic radicals having 1 to 5 carbons, m is 0 or 1, and n is 1 to about 40; and wherein the fluid is in contact with a subterranean formation;
  the method comprising, allowing carbonic acid to form in the fluid while the fluid is in contact with the subterranean formation and allowing the carbonic acid to break the foamed fluid.

26. The method of claim 25, further comprising removing the composition from the formation.

27. The method of claim 25, wherein the method does not further comprise introducing a breaker into the well bore.

28. The method of claim 25, further comprising introducing a breaker into the well bore.

29. The method of claim 28, wherein the breaker is an acid.

30. The method of claim 29, wherein the acid is selected from the group consisting of hydrochloric, sulfuric, hydrofluoric, acetic, citric, formic, oxalic, phosphoric, sulfonic, adipic, fumaric and propionic acid.

* * * * *

UNITED STATES PATENT AND TRADEMARK OFFICE
CERTIFICATE OF CORRECTION

| | | |
|---|---|---|
| PATENT NO. | : 7,201,227 B2 | Page 1 of 1 |
| APPLICATION NO. | : 11/017548 | |
| DATED | : April 10, 2007 | |
| INVENTOR(S) | : Gupta et al. | |

It is certified that error appears in the above-identified patent and that said Letters Patent is hereby corrected as shown below:

Detailed Description of the Invention

Column 3, Line 53, after "foams" cancel --typically--.

Columns 9-10, Table 1, Header Column 6, cancel "(hr:min)" and insert --(min:sec)--.

Signed and Sealed this

Fourth Day of September, 2007

JON W. DUDAS
*Director of the United States Patent and Trademark Office*